US007832881B2

(12) United States Patent
Yamaguchi et al.

(10) Patent No.: US 7,832,881 B2
(45) Date of Patent: Nov. 16, 2010

(54) MIRROR DRIVE APPARATUS AND IMAGING APPARATUS

(75) Inventors: Masato Yamaguchi, Kanagawa (JP); Masahiro Negita, Aichi (JP); Kazutaka Tada, Hyogo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/453,093

(22) Filed: Apr. 29, 2009

(65) Prior Publication Data

US 2009/0284819 A1 Nov. 19, 2009

(30) Foreign Application Priority Data

May 14, 2008 (JP) ............................ 2008-127015

(51) Int. Cl.
*G02B 7/182* (2006.01)

(52) U.S. Cl. ...................................................... 359/876

(58) Field of Classification Search ................. 359/872, 359/876, 223–226

See application file for complete search history.

(56) References Cited

U.S. PATENT DOCUMENTS 6,227,726 B1 * 5/2001 Higuchi ...................... 396/358

FOREIGN PATENT DOCUMENTS

JP 57-16179 4/1982
JP 02-009331 A 1/1990
JP 09-068753 A 3/1997
JP 2008-053844 A 3/2008

OTHER PUBLICATIONS

English language translation of the Japanese Office Action issued Feb. 2, 2010 for corresponding Japanese Application No. 2008-127015.

* cited by examiner

*Primary Examiner*—Euncha P Cherry
(74) *Attorney, Agent, or Firm*—Rader, Fishman & Grauer PLLC

(57) ABSTRACT

A mirror drive apparatus includes a movable unit including a mirror used to switch an optical path in an imaging apparatus, a drive mechanism capable of switching the movable unit between a first and second attitudes by pivoting the movable unit around a predetermined pivotal axis, an elastic member and a locking mechanism provided on one side of the pivotal axis, the elastic member producing an urging force for switching the movable unit from the first attitude to the second attitude, the locking mechanism capable of maintaining the first attitude of the movable unit on which the urging force acts and releasing the movable unit, and a toggle mechanism provided on the other side of the pivotal axis and capable of switching the movable unit between the first attitude and the second attitude by urging the movable unit so that the movable unit takes the first or second attitude.

4 Claims, 11 Drawing Sheets

MIRROR DRIVE APPARATUS AND IMAGING APPARATUS

BACKGROUND OF THE INVENTION

1. Field of the Invention

The present invention relates to a technology of a mirror drive apparatus including a movable unit with a mirror provided therein and used to switch an optical path.

2. Description of the Related Art

A single-lens reflex camera (imaging apparatus) typically includes a mirror box (mirror drive apparatus) configured as what is called a quick-return mirror insertable and retractable to and from the optical path of an imaging lens. The mirror box includes a mirror unit (movable unit) that can change its position (attitude) between an inserted position in which the mirror unit is inserted to the optical path and a retracted position in which the mirror unit is retracted from the optical path.

An example of the mirror box includes a locking mechanism that works against a mirror drive spring to lock the mirror unit in the inserted position and a drive mechanism that releases the mirror unit locked by the locking mechanism so that the mirror drive spring drives the mirror unit to the retracted position (see JP-UM-B-57-16179, for example).

SUMMARY OF THE INVENTION

In the mirror box described in JP-UM-B-57-16179, however, the mirror drive spring and the locking mechanism are provided on one side of the drive mechanism. Therefore, when use of a link causes mechanical play, the attitudes of the mirror unit described above are not stably maintained in the inserted and retracted positions on the side where the mirror drive spring or the locking mechanism are not provided.

To solve the problem, it is conceivable that another identically configured drive spring and locking mechanism may be provided on the other side of the drive mechanism. In this case, however, the configuration of the mirror box is disadvantageously complicated.

Thus, it is desirable to provide a technology of a simply configured mirror drive apparatus capable of stably maintaining the attitudes of the movable unit with a mirror provided therein.

An embodiment of the invention is directed to a mirror drive apparatus including a movable unit including a mirror used to switch an optical path in an imaging apparatus, a drive mechanism capable of switching the attitude of the movable unit between a first attitude and a second attitude by pivoting the movable unit around a predetermined pivotal axis, an elastic member and a locking mechanism provided on one side of the predetermined pivotal axis in the drive mechanism, the elastic member producing an urging force for switching the attitude of the movable unit from the first attitude to the second attitude, the locking mechanism capable of not only maintaining the first attitude of the movable unit on which the urging force of the elastic member acts but also releasing the movable unit from the first attitude, and a toggle mechanism provided on the other side, which differs from the one side, of the predetermined pivotal axis in the drive mechanism, the toggle mechanism allowing the attitude of the movable unit to switch between the first attitude and the second attitude by urging the movable unit so that the movable unit takes the first attitude or the second attitude.

According to the embodiment of the invention, on one side of a drive mechanism capable of switching the attitude of a movable unit including a mirror used to switch an optical path between a first attitude and a second attitude are provided an elastic member producing an urging force for switching the attitude of the movable unit from the first attitude to the second attitude and a locking mechanism capable of not only maintaining the first attitude of the movable unit on which the urging force of the elastic member acts but also releasing the movable unit from the first attitude, and on the other side, which differs from the one side, of the drive mechanism is provided a toggle mechanism capable of switching the attitude of the movable unit between the first attitude and the second attitude by urging the movable unit so that the movable unit takes the first attitude or the second attitude. As a result, the attitudes of the movable unit including a mirror can be stably maintained in a simple configuration.

DESCRIPTION OF THE PREFERRED EMBODIMENTS

External Configuration of Imaging Apparatus

Figure 1:
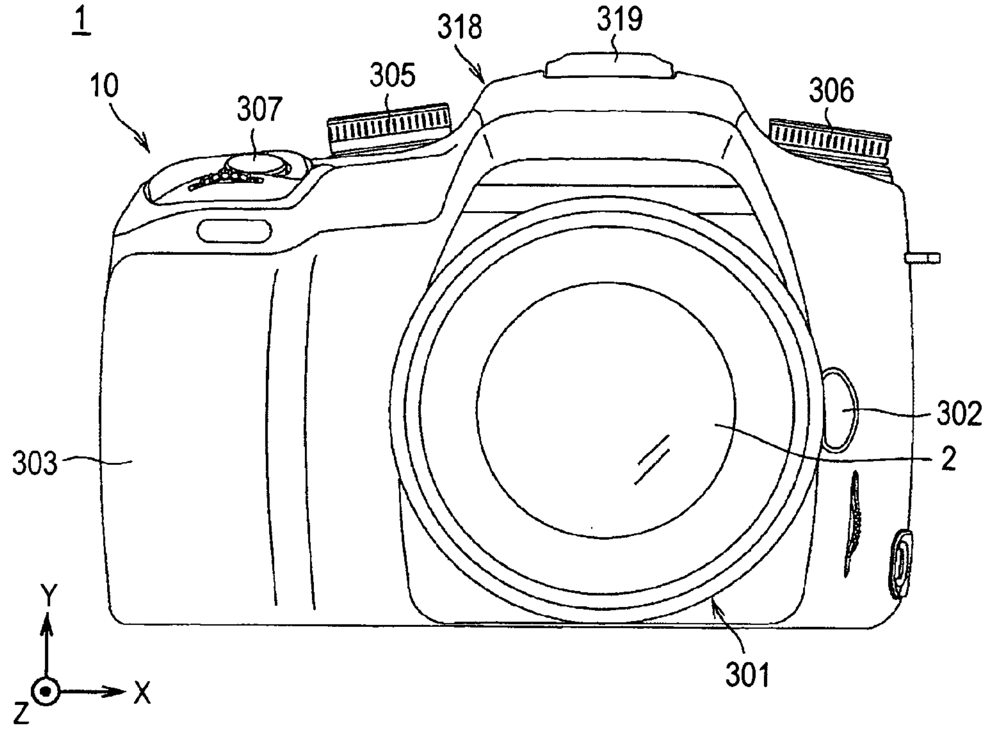
FIG. 1 shows the external configuration of an imaging apparatus 1 according to an embodiment of the invention.
Figure 2:
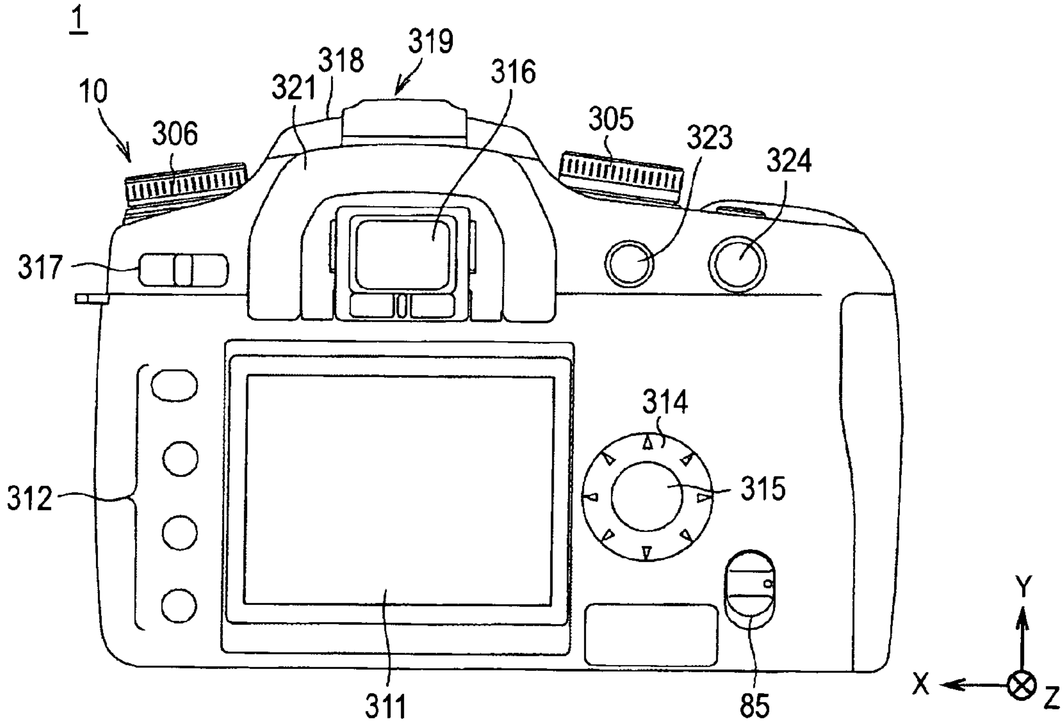
FIG. 2 shows the external configuration of the imaging apparatus 1.

FIGS. 1 and 2 show the external configuration of an imaging apparatus 1 according to an embodiment of the invention. FIG. 1 is a front view, and FIG. 2 is a rear view.

The imaging apparatus 1 is configured, for example, as a single-lens reflex digital still camera and includes a camera body 10 and an interchangeable lens 2 as an imaging lens that can be attached and detached to and from the camera body 10.

FIG. 1 shows the following components provided on the front side of the camera body 10: a mount 301 that is disposed in a substantially central portion of the front side and to which the interchangeable lens 2 is attached, a lens interchanging button 302 disposed to the right of the mount 301, and a grip 303 at which the camera body 10 can be gripped. The camera body 10 further includes a mode setting dial 305 disposed in an upper left portion when viewed from the front, a control value setting dial 306 disposed in an upper right portion when viewed from the front, and a shutter button 307 disposed on the upper side of the grip 303.

FIG. 2 shows the following components provided on the rear side of the camera body 10: an LCD (Liquid Crystal Display) 311, a group of setting buttons 312 disposed to the left of the LCD 311, a cross-shaped key 314 disposed to the right of the LCD 311, a push button 315 disposed at the center of the cross-shaped key 314, an optical finder 316 disposed above the LCD 311, an eye cup 321 that surrounds the optical finder 316, a main switch 317 disposed to the left of the optical finder 316, an exposure correction button 323 and an AE lock button 324 disposed to the right of the optical finder 316, and a flashlight 318 and a connection terminal 319 disposed above the optical finder 316.

The mount 301 has a connector for electrically connecting the mount 301 to the attached interchangeable lens 2 and a coupler for mechanically connecting the two components.

The lens interchanging button 302 is pushed down to remove the interchangeable lens 2 attached to the mount 301.

The grip 303 is the portion at which the user grips the imaging apparatus 1 during imaging. The surface of the grip 303 is corrugated to match the shape of fingers so that the fingers fit to the grip 303 more comfortably. The grip 303 has a battery compartment and a card compartment (not shown) provided therein. The battery compartment houses a battery as a power source of the camera, and the card compartment detachably houses a memory card for storing image data of captured images. The grip 303 may include a grip sensor for detecting whether or not the user grips the grip 303.

Each of the mode setting dial 305 and the control value setting dial 306 is composed of a substantially disc-shaped member rotatable in a plane substantially parallel to the upper surface of the camera body 10. The mode setting dial 305 is provided to select any one of the modes and functions provided in the imaging apparatus 1, such as an auto-exposure (AE) control mode, an autofocus (AF) control mode, a variety of imaging modes including a still image capture mode for capturing a single still image and a continuous imaging mode for continuously capturing images, and a reproducing mode for reproducing recorded images. The control value setting dial 306 is provided to set control values used in the variety of functions provided in the imaging apparatus 1.

The shutter button 307 is a push-down switch that allows two operation states, a "half-pressed state" in which the shutter button 307 is pressed halfway and a "fully-pressed state" in which the shutter button 307 is further pressed. When the shutter button 307 is pressed halfway in the still image capture mode, preparation actions (setting an exposure control value and detecting the focus) for capturing a still image of a subject are carried out. When the shutter button 307 is fully pressed, imaging actions (a series of actions including exposing an imaging device 101 (see FIG. 3) to light, performing predetermined image processing on an image signal obtained by the exposure action, and recording the resultant image signal in the memory card) are carried out.

The LCD 311 includes a color liquid crystal panel capable of displaying an image. The LCD 311 not only displays an image captured by the imaging device 101 (see FIG. 3) and reproduces and displays a recorded image, but also displays a setting screen for setting the functions and modes provided in the imaging apparatus 1. The LCD 311 may be replaced with an organic EL display or a plasma display.

The group of setting buttons 312 are provided to operate the variety of functions provided in the imaging apparatus 1. The group of setting buttons 312 include a selection acceptance switch for accepting the operation selected in a menu screen displayed on the LCD 311, a selection cancel switch, a menu display switch for switching the operation displayed on the menu screen, a display on/off switch, and a display enlarging switch.

The cross-shaped key 314 has an annular member including a plurality of pressing portions disposed at equal spacings in the circumferential direction (the portions indicated by the triangular marks in FIG. 2), and contacts (switches) (not shown) provided in correspondence with the pressing portions detect pressing operations on the respective pressing portions. The push button 315 is disposed at the center of the cross-shaped key 314. The cross-shaped key 314 and the push button 315 are provided to input instructions, such as changing the imaging magnification (moving a zoom lens toward a wide angle side or a telescopic side), advancing frames of stored images to be reproduced on the LCD 311 or any other monitor, and setting imaging conditions (such as the aperture setting, shutter speed, and flashlight activation).

The optical finder 316 optically displays the area in which a subject is imaged. That is, an image of the subject is guided through the interchangeable lens 2 to the optical finder 316, and the user looks into the optical finder 316 to visually recognize the subject to be actually imaged by the imaging device 101.

The main switch 317 is composed of a two-contact slidable switch that slides sideways. When the main switch 317 is set to the left contact, the imaging apparatus 1 is turned on, whereas when the main switch 317 is set to the right contact, the imaging apparatus 1 is turned off.

The flashlight 318 includes a popup-type built-in flashlight. On the other hand, an external flashlight or any other components is attached to the camera body 10 by using the connection terminal 319.

The eye cup 321 is a U-shaped, light-blocking member that prevents external light from entering the optical finder 316.

The exposure correction button 323 is provided to manually adjust the exposure setting (aperture setting and shutter speed). The AE lock button 324 is provided to lock the exposure conditions.

The interchangeable lens 2 functions as not only a lens window through which the light from a subject (optical image) passes but also an imaging optical system for guiding the subject light to the imaging device 101 disposed in the camera body 10. The interchangeable lens 2 can be detached from the camera body 10 by pressing down the lens interchanging button 302 described above.

Figure 3:
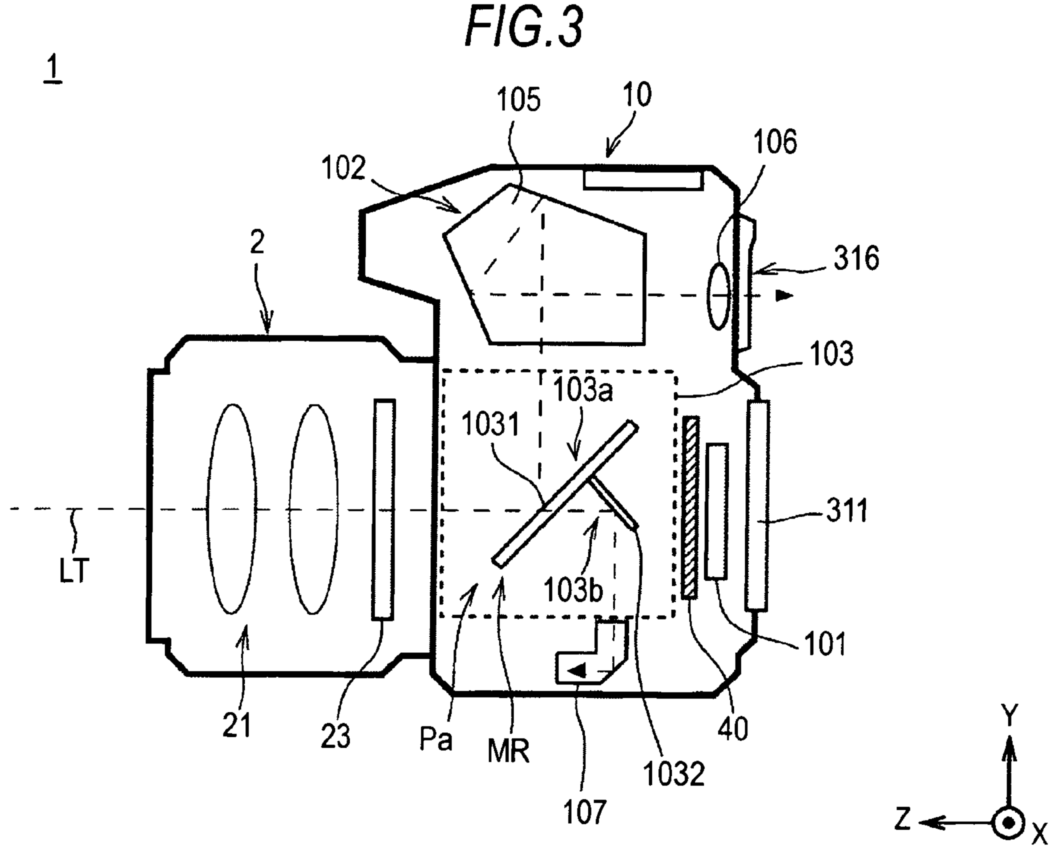
FIG. 3 is a longitudinal cross-sectional view of the imaging apparatus 1.

The interchangeable lens 2 includes a lens group 21 composed of a plurality of lenses disposed in series along an optical axis LT (see FIG. 3). The lens group 21 includes a focus lens for adjusting the focus and a zoom lens for changing the magnification. Moving the focus lens and the zoom lens along the optical axis LT (see FIG. 3) allows the magnification to be changed and the focus to be adjusted, respectively. The interchangeable lens 2 further includes an operation ring provided in an appropriate outer circumferential portion of a lens barrel of the interchangeable lens 2, and the operation ring is rotatable in the circumferential direction of the lens barrel. The zoom lens moves in the optical axis direction in accordance with the direction and amount of rotation of the operation ring to set a zoom magnification (imaging magnification) manually or automatically according to the position to which the zoom lens has moved.

<Internal Configuration of Imaging Apparatus 1>

The internal configuration of the imaging apparatus 1 will be described below. FIG. 3 is a longitudinal cross-sectional view of the imaging apparatus 1. As shown in FIG. 3, the camera body 10 houses the imaging device 101, a finder 102 (finder optical system), a mirror box (mirror drive apparatus) 103, and a phase-difference AF module 107. FIG. 3 shows a simplified form of a primary mirror holder 1031 and other components, which will be described later, for convenience of illustration.

The imaging device 101 is disposed on the optical axis LT of the lens group that forms the interchangeable lens 2 attached to the camera body 10 in such a way that the imaging device 101 intersects the optical axis LT at right angles. The imaging device 101 is, for example, a CMOS color area sensor (CMOS-type imaging device) in which a plurality of pixels, each of which being a photodiode, are arranged two-dimensionally in a matrix. The imaging device 101 produces analog electric signals (image signals) for R (red), G (green), and B (blue) components contained in the subject light beam received through the interchangeable lens 2, and outputs the electric signals as R, G, and B image signals.

The mirror box 103 (indicated by the broken line) is fixed to the camera body 10 in a position on the optical axis LT where the subject light is reflected toward the finder 102. The subject light having passed through the interchangeable lens 2 is reflected upward off a primary mirror 103*a* (which will be described later) in the mirror box 103. Part of the subject light having passed through the interchangeable lens 2 passes through the primary mirror 103*a*.

The finder 102 includes a pentaprism 105, an ocular lens 106, and the optical finder 316. The pentaprism 105 has a pentagonal cross-sectional shape and reverses the subject optical image, which is incident through the lower surface of the pentaprism 105, in the horizontal and vertical directions into an erect image by using internal reflection. The ocular lens 106 guides the erect subject image, which has passed through the pentaprism 105, out of the optical finder 316. The thus configured finder 102 functions as a finder for checking the field to be imaged during an imaging standby period before a final image is captured.

The mirror box 103 houses a drivable mirror unit MR including the primary mirror holder 1031 that hold the primary mirror 103*a* and a secondary mirror holder 1032 that holds a secondary mirror 103*b*. The mirror unit MR can take an attitude in which the secondary mirror 103*b*, which is disposed on the backside of the primary mirror holder 1031, appears to fall toward the backside of the primary mirror holder 1031, as shown in FIG. 3. When the mirror unit MR takes the attitude Pa shown in FIG. 3 (hereinafter sometimes referred to as a "mirror-down attitude"), part of the subject light having passed through the primary mirror 103*a* is reflected off the secondary mirror 103*b*, and the reflected subject light is incident on the phase-difference AF module 107.

Figure 4:
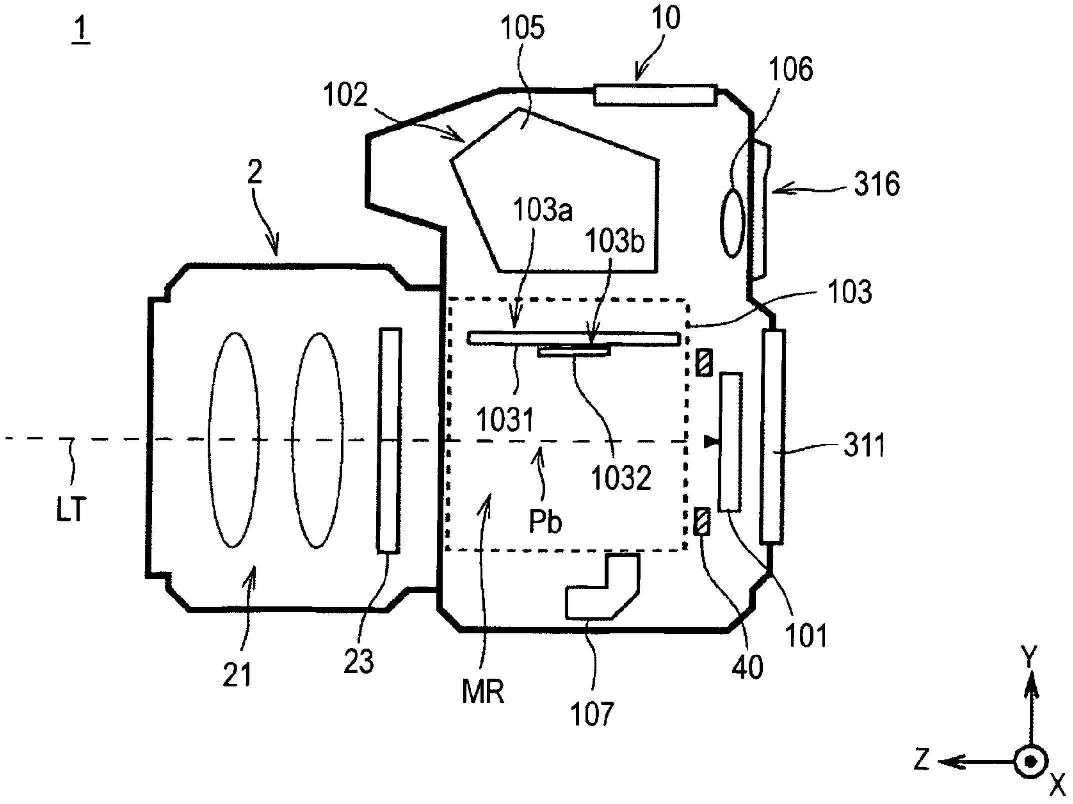
FIG. 4 explains a mirror-up attitude Pb of a mirror unit MR.

The mirror unit MR, which functions as what is called a quick-return mirror used to switch the optical path in the imaging apparatus 1, can take an attitude Pb during exposure (when a final image is captured) in which the mirror unit MR is retracted in an upper portion of the mirror box 103 (hereinafter sometimes referred to as a "mirror-up attitude"), as shown in FIG. 4. In this case, the secondary mirror 103*b* collapses so that it is substantially parallel to the primary mirror 103*a*. When the mirror unit MR changes its attitude from the mirror-down attitude Pa (see FIG. 3) to the mirror-up attitude Pb, a four-node link mechanism allows the mirror unit MR to swing back, as will be described later. The mirror-up attitude Pb allows the subject light having passed through the interchangeable lens 2 not to be blocked by the mirror unit MR but to reach the imaging device 101, and the imaging device 101 is exposed to the subject light. When the imaging action in the imaging device 101 is completed, the mirror unit MR returns to its original position (the mirror-down attitude Pa shown in FIG. 3).

When the mirror unit MR takes the mirror-up attitude Pb shown in FIG. 4 before a final image is captured (before an image to be recorded is captured), the imaging apparatus 1 can operate in a live-view (preview) display mode in which the subject is displayed on the LCD 311 in a video form based on image signals successively produced by the imaging device 101. That is, before a final image is captured, the imaging apparatus 1 offers a choice between an electronic finder in which the live-view display is available (live-view mode) and the optical finder to determine a composition of the subject. The switching between the electronic finder and the optical finder is carried out by operating a switch 85 shown in FIG. 2.

The phase-difference AF module 107 functions as a focus detection sensor for detecting a state in which a subject is in focus when the AF module 107 receives the subject light reflected off the secondary mirror 103*b* in the mirror-down attitude Pa. The phase-difference AF module 107 is disposed below the mirror box 103, and detects the focus position based on phase-difference focus detection (hereinafter sometimes referred to as "phase-difference AF").

A shutter unit 40 is disposed in front of the imaging device 101 in the optical axis direction. The shutter unit 40 is configured as a mechanical focal-plane shutter including a vertically moving screen and opening and closing the screen to open and close the optical path along which the subject light is guided to the imaging device 101 along the optical axis LT. The shutter unit 40 can be omitted when the imaging device 101 has a fully electronic shutter capability.

<Configuration of Key Parts of Mirror Box 103>

Figure 5:
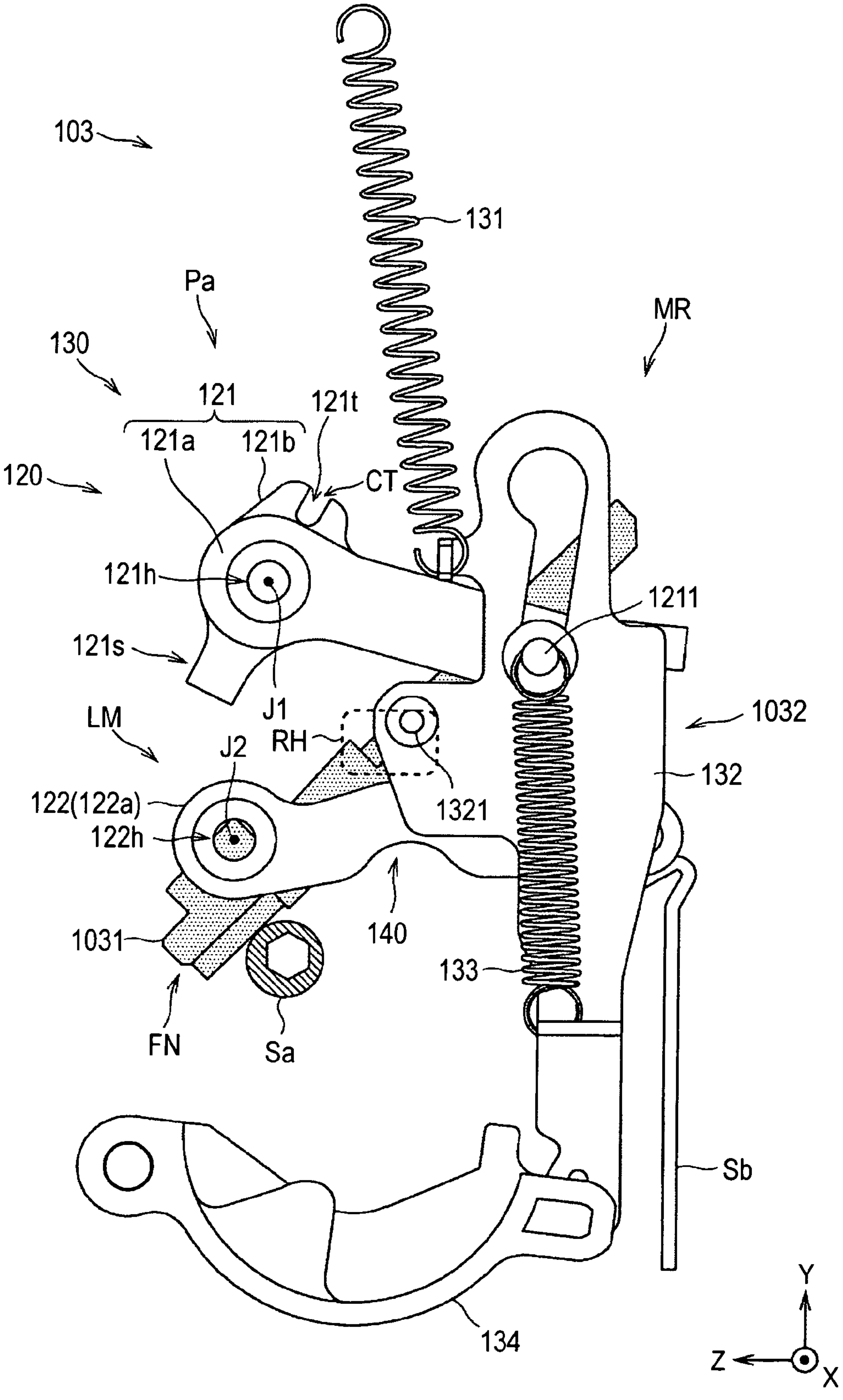
FIG. 5 explains the configuration of key portions of a mirror box 103.
Figure 6:
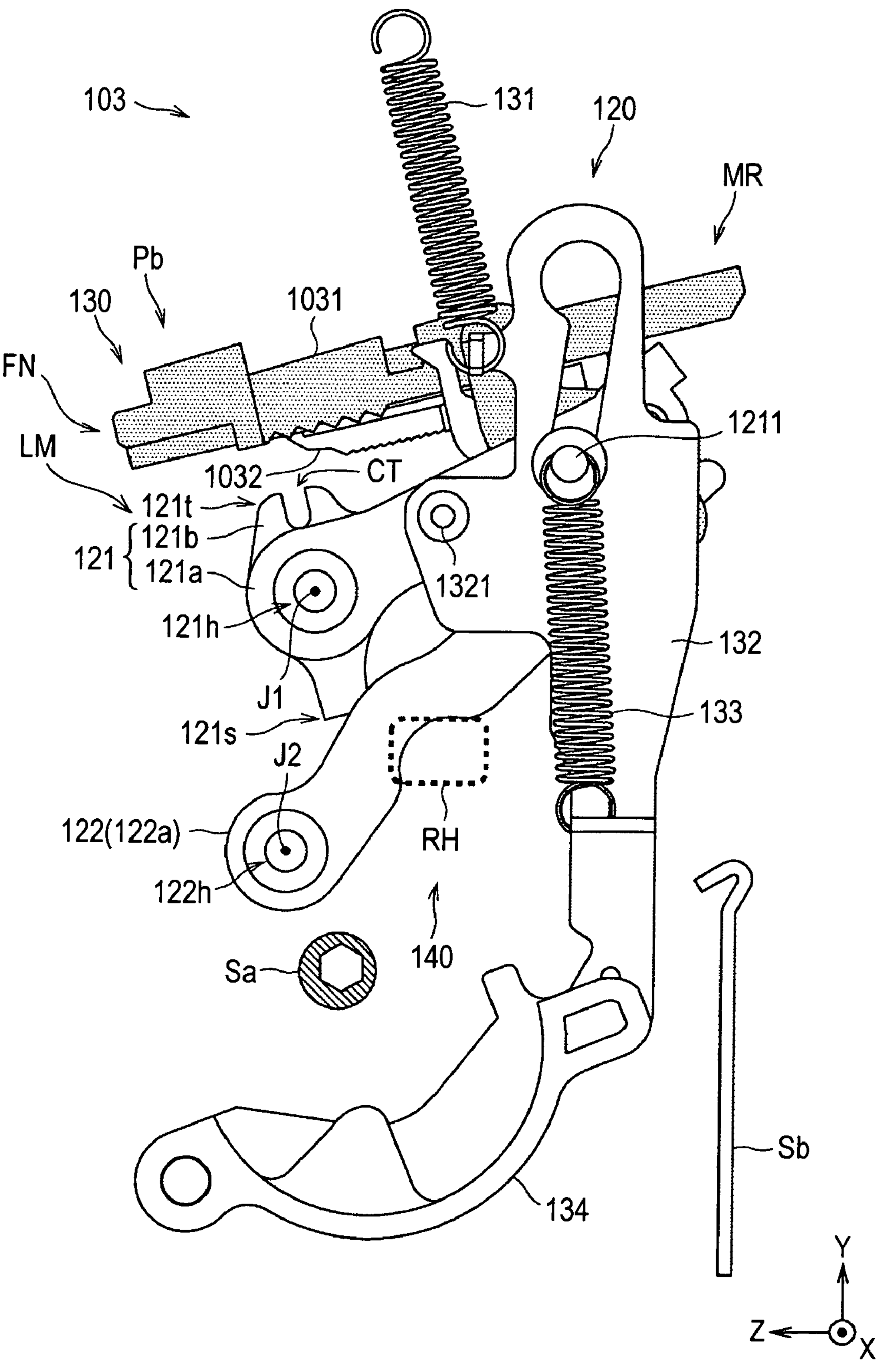
FIG. 6 explains the configuration of key portions of the mirror box 103.
Figure 7:
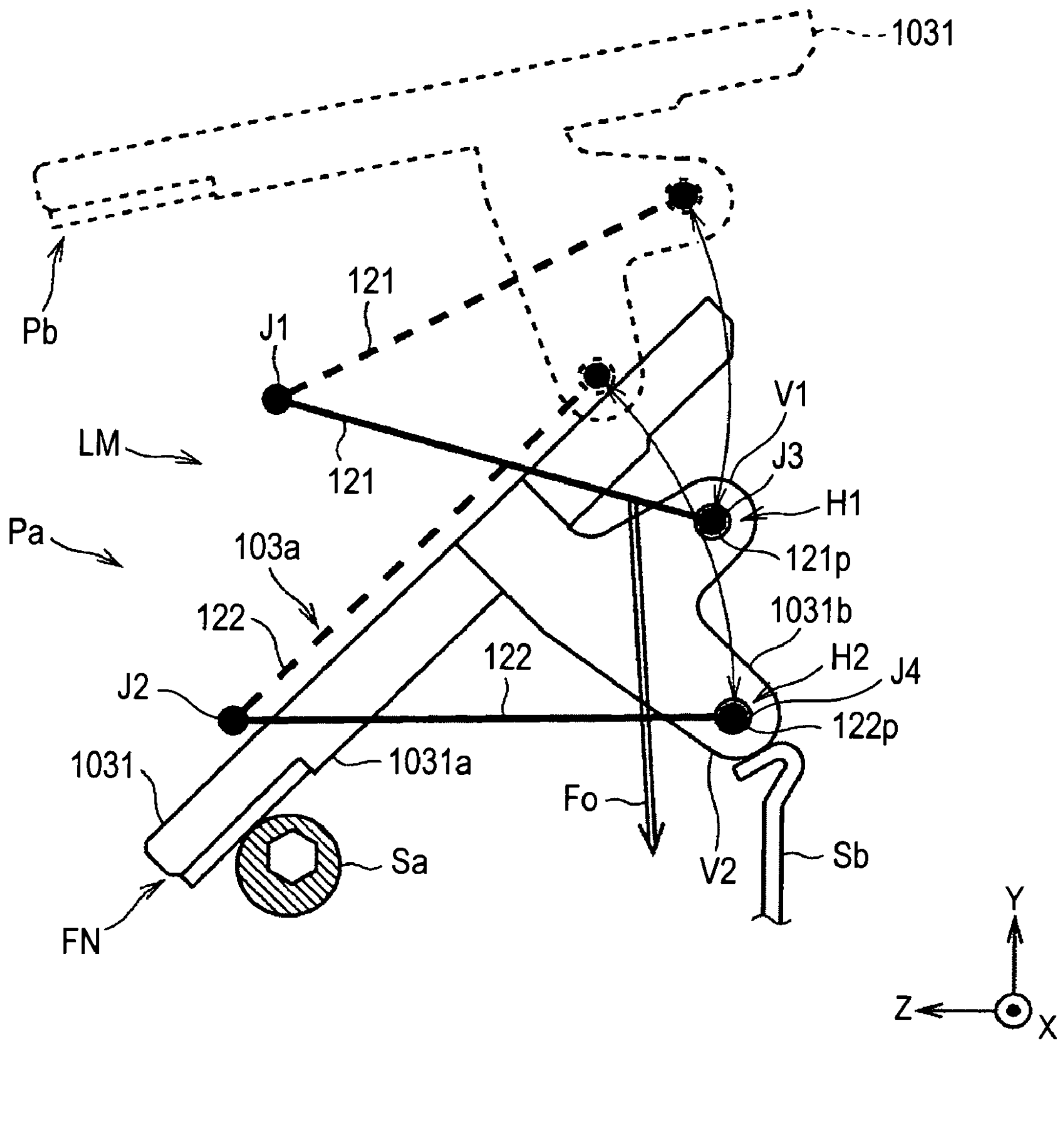
FIG. 7 explains how a primary mirror holder 1031 goes up and down.

FIGS. 5 and 6 explain the configuration of key portions of the mirror box 103 (side views when the mirror box 103 is viewed from the +X direction), and show the mirror unit MR and the surroundings thereof when the mirror unit MR takes the mirror-down attitude Pa and the mirror-up attitude Pb, respectively. FIG. 7 explains how the primary mirror holder 1031 goes up and down. In FIG. 7, the structures of the primary mirror holder 1031 and other components are simplified as compared to those in FIGS. 5 and 6.

The mirror box 103 includes the mirror unit MR described above and a drive mechanism 120 for driving the mirror unit MR.

The drive mechanism 120 includes two drive arms 121 (121*a* and 121*b*) and two auxiliary arms 122 (122*a* and 122*b*) pivotally connected to the sides of the primary mirror holder 1031, and a drive unit 130 that produces a drive force acting on the drive arms 121*a*.

Each of the drive arms 121, when a pin or any other suitable axial member (not shown) fixed to the mirror box 103 fits in a hole 121*h* in an end of the drive arm 121, can pivot around a pivotal axis J1 (around the X-axis).

Each of the auxiliary arms 122, when a pin or any other suitable axial member (not shown) fixed to the mirror box 103 fits in a hole 122*h* in an end of the auxiliary arm 122, can pivot around a pivotal axis J2 (around the X-axis).

The drive unit 130 includes a mirror drive spring 131 configured as a coiled spring that produces an upward (approximately in the +Y direction) drive force to change the attitude of the mirror unit MR from the mirror-down attitude Pa to the mirror-up attitude Pb. The drive unit 130 further includes a mirror-charge connection plate 132 slidable upward (approximately in the +Y direction) in response to the drive force of the mirror drive spring 131, and a mirror-overcharge spring 133 configured as a coiled spring elastically connecting the mirror-charge connection plate 132 to a pin 1211 on the drive arm 121 on the side where the drive unit 130 is provided.

The mirror-charge connection plate 132 has a cylindrical locking pin 1321 protruding therefrom. In the mirror-down attitude Pa, the locking pin 1321 is locked in a locking hole RH (broken line) provided in a mirror release lever (not shown) as shown in FIG. 5, when a cam (not shown) rotated by a motor or any other actuator presses down a mirror-charge lever 134 connected to the mirror-charge connection plate 132. In a locking mechanism 140 including the locking pin 1321 and the locking hole RH, when the locking pin 1321 is locked in the locking hole RH, the mirror-overcharge spring 133 is slightly stretched, and a downward restoring force of the mirror-overcharge spring 133 acts on the pin 1211 on the drive arm 121. When the mirror release lever with the locking hole RH provided therein is driven by a solenoid or any other suitable actuator, the locking pin 1321 disengages from the locking hole RH, and the attitude of the mirror unit MR is changed to the mirror-up attitude Pb shown in FIG. 6.

The mirror unit MR includes the primary mirror holder 1031 (shaded in FIGS. 5 and 6) and the secondary mirror holder 1032, as described above.

The primary mirror holder 1031 includes a body **1031*a* that holds the primary mirror 103*a* and two y-shaped arms 1031*b* connected to the sides of the body 1031*a* (see FIG. 7**).

Each of the two arms **1031*b* branches into two ends V1 and V2, and circular holes H1 and H2 are formed at the two ends (FIG. 7). When pins 121*p* and 122*p* (the filled circles in FIG. 7) provided at ends of the drive arm 121 and the auxiliary arm 122 on the same side as the drive arm 121 fit in the holds H1 and H2, respectively, the primary mirror holder 1031 can pivot around pivotal axes J3 and J4 (FIG. 7**).

The drive arm 121 and the auxiliary arm 122 pivotally connected to the holes H1 and H2 in the primary mirror holder 1031 form the drive mechanism 120 including the four pivotal axes J1 to J4. The thus formed four-node link mechanism LM, when the drive mechanism 120 pivots around the four pivotal axes J1 to J4, can switch the attitude of the primary mirror holder (movable unit) 1031 between the mirror-down attitude (first attitude) Pa and the mirror-up attitude (second attitude) Pb. When the four-node link mechanism LM drives the primary mirror holder 1031 between the mirror-down attitude Pa and the mirror-up attitude Pb (indicated by the broken lines) as shown in FIG. 7, the path of a front end FN of the primary mirror holder 1031 does not protrude toward the interchangeable lens 2 or does not interfere with the rear-end lens of the interchangeable lens 2, that is, the primary mirror holder 1031 can swing back.

On the other hand, the mirror box 103 includes a front stopper Sa that abuts a portion in the vicinity of the front end FN of the primary mirror holder 1031 and two rear stoppers Sb that abut portions in the vicinity of the ends V2 of the arms **1031*b* connected to the primary mirror holder 1031, each of the front stopper Sa and the rear stoppers Sb functioning as a member that restricts the four-node link mechanism LM to position, for example, the primary mirror holder 1031 in the mirror-down attitude Pa in which the primary mirror 103*a* is inclined to the vertical direction by 45 degrees. In the mirror-down attitude Pa, an urging force Fo produced by the mirror-overcharge spring 133 (FIG. 7) and acting on the drive arm 121 presses the primary mirror holder 1031** against the front stopper Sa and the rear stoppers Sb, whereby the mirror-down attitude Pa is maintained.

The thus configured mirror box 103 further includes a mechanism for reducing play present in the four-node link mechanism LM. The play reduction mechanism will be described below in detail.

<Toggle Mechanism>

Since the mirror box 103 described above includes the mirror drive spring 131 in the drive unit 130 and the locking mechanism 140 on one side of the four-node link mechanism LM, there is likely mechanical play on the other side. As a result, the mirror-down attitude Pa and the mirror-up attitude Pb of the mirror unit MR are not stably maintained on the side of the four-node link mechanism LM where the drive unit 130 is not provided.

To address the problem, in the mirror box 103 of the present embodiment, a toggle mechanism is provided on the side of the four-node link mechanism LM where the drive unit 130 is not provided to stably maintain the attitudes of the mirror unit MR, the toggle mechanism capable of locking itself in both direction (the mirror-down attitude Pa and the mirror-up attitude Pb) from a reversing point (dead center). The configuration of the toggle mechanism will be described below with reference to FIGS. 8 and 9.

Figure 8:
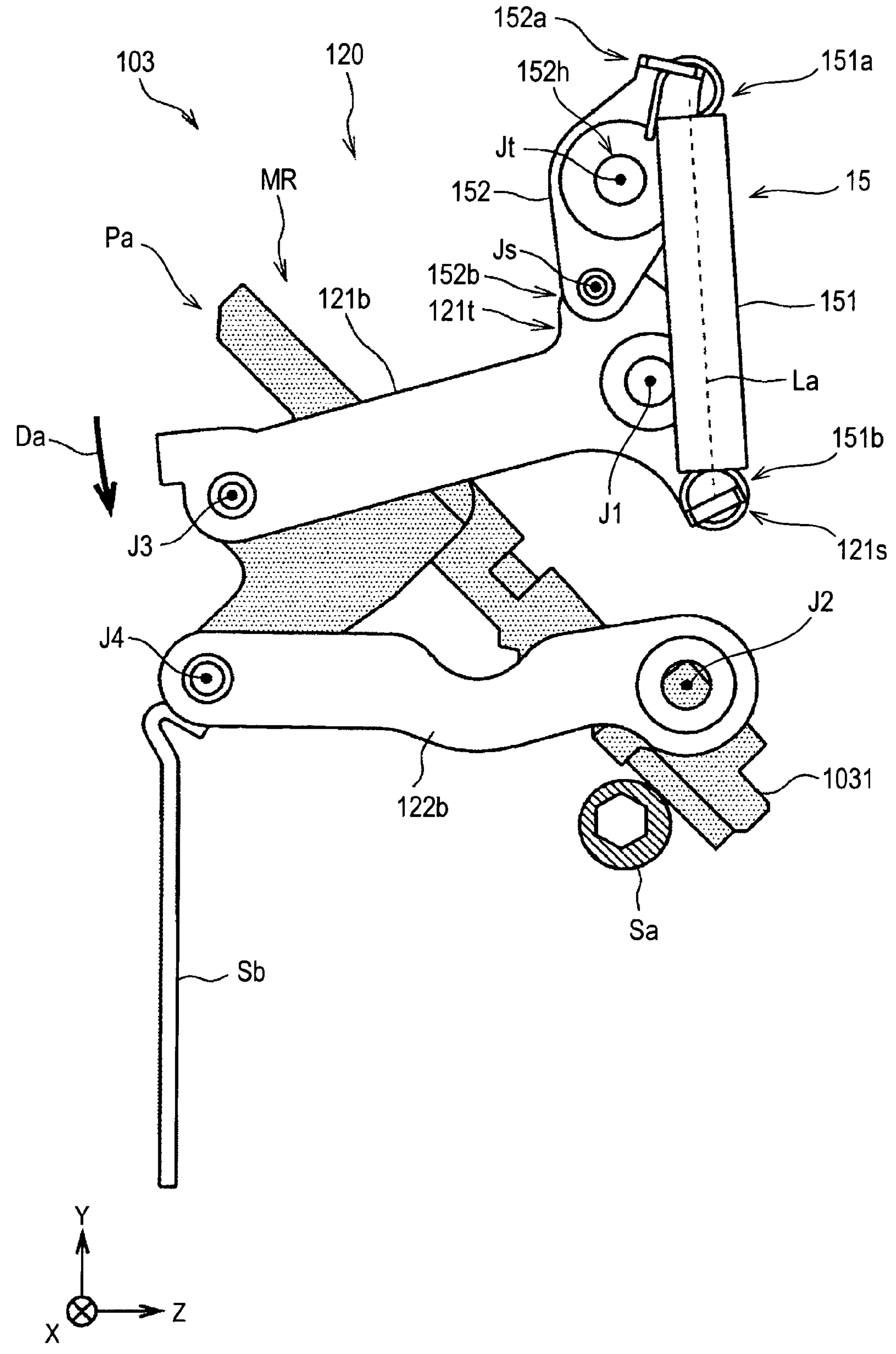
FIG. 8 explains the configuration of key portions of a toggle mechanism 15.
Figure 9:
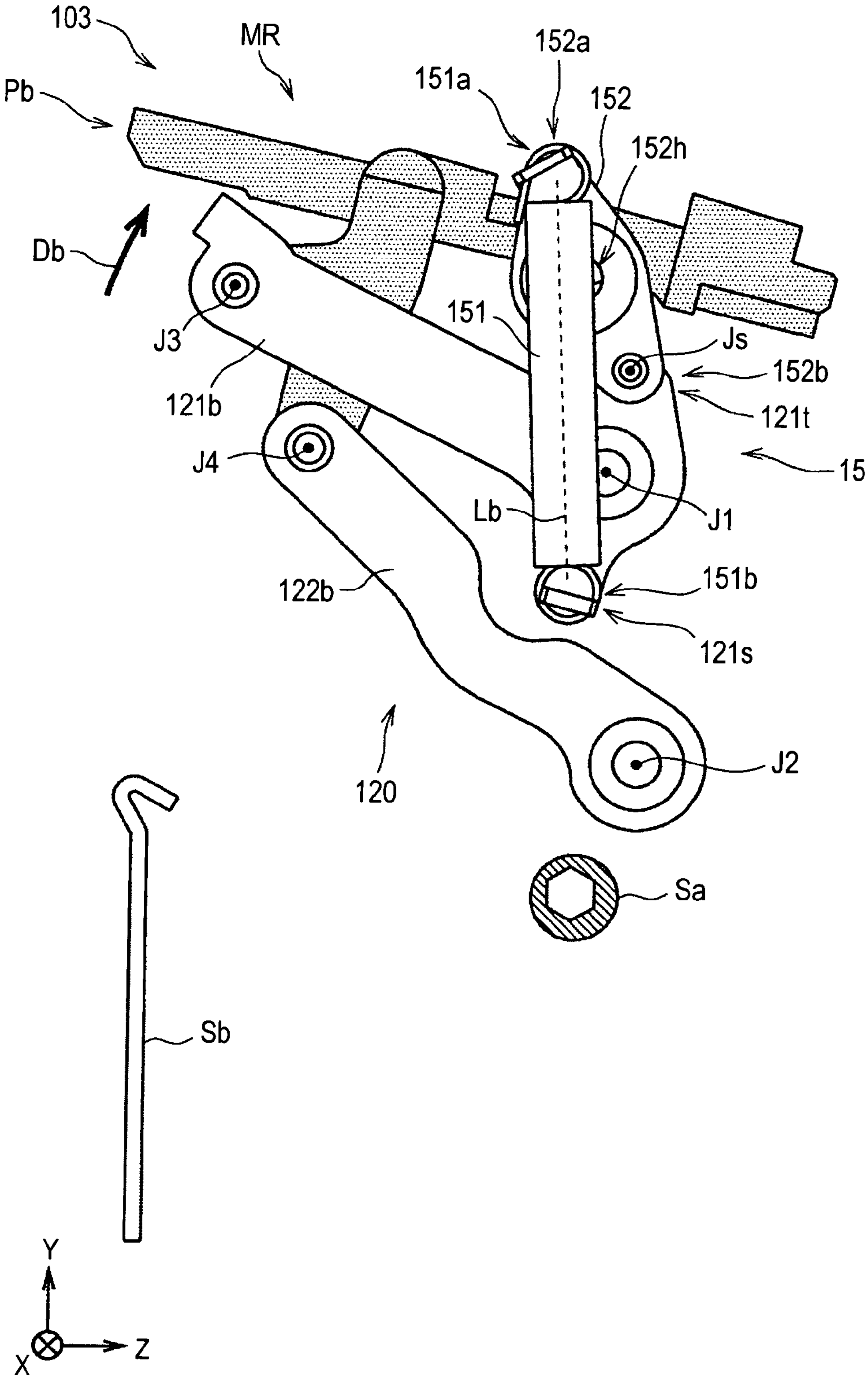
FIG. 9 explains the configuration of key portions of the toggle mechanism 15.

FIGS. 8 and 9 explain the configuration of key portions of a toggle mechanism 15 and show the primary mirror holder 1031 and the surroundings thereof in the mirror-down attitude Pa and the mirror-up attitude Pb, respectively. FIGS. 8 and 9 are side views when the mirror box 103 is viewed from the side opposite the side from which the mirror box 103 is viewed in FIGS. 5 and 6, that is, from the (−X) direction.

The toggle mechanism 15 includes a toggle spring 151 that serves as an urging spring that urges the mirror unit MR so that the mirror unit MR takes the mirror-down attitude Pa or the mirror-up attitude Pb, and a toggle lever (connection member) 152 connected to an end **151*a* of the toggle spring 151**.

The toggle spring 151 is configured, for example, as a coiled spring and connected to the toggle lever 152 when a hook provided at the one end **151*a* is hooked in a hole formed in an end 152*a* of the toggle lever 152. Further, the toggle spring 151 is connected to the drive arm 121*b* on the side where the toggle mechanism 15 is provided when a ring provided at the other end 151*b* of the toggle spring 151 is held by a cutout provided at an end 121*s* of the drive arm 121*b***.

The toggle lever 152 is connected to the drive arm **121*b* so that the toggle lever 152 can pivot around a pivotal axis Js (around X-axis) when a pivotal portion provided at an end 152*b* of the toggle lever 152 is fixed to a cutout CT (see FIGS. 5 and 6) at an end 121*t* of the drive arm 121*b* provided on the opposite side of the pivotal axis J1 to the end 121*s*. The toggle lever 152 can also pivot around a supporting point Jt (around X-axis) when a pin or any other suitable axial member (not shown) fixed to the mirror box 103 fits in a hole 152*h* formed in the vicinity of the center of the toggle lever 152**.

The thus configured toggle mechanism 15 allows the urging force of the toggle spring 151 to act on the drive arm **121*b* in the counterclockwise direction Da around the pivotal axis J1 when the mirror unit MR takes the mirror-down attitude Pa, as shown in FIG. 8. As a result, the primary mirror holder 1031 is pressed against the stoppers Sa and Sb also on the side of the mirror unit MR where the drive unit 130** is not provided, whereby the mirror-down attitude Pa can be stably maintained.

It is noted that since the drive force of the mirror drive spring 131 acting on the drive arm **121*b* on the side where the drive unit 130 is provided changes the mirror-down attitude Pa of the mirror unit MR to the mirror-up attitude Pb, the urging force of the toggle spring 151 acting on the drive arm 121***b* on the side where the toggle mechanism 15 is provided must be typically smaller than the drive force in the mirror-down attitude Pa.

On the other hand, when the mirror unit MR takes the mirror-up attitude Pb, the toggle mechanism 15 allows the urging force of the toggle spring 151 to act on the drive arm 121*b* in the clockwise direction Db around the pivotal axis J1, as shown in FIG. 9. As a result, the mirror-up attitude Pb can be stably maintained also on the side of the mirror unit MR where the drive unit 130 is not provided.

In the imaging apparatus 1 described above, the mirror drive spring 131, which is formed of an elastic member and produces the urging force that allows the mirror-down attitude Pa of the mirror unit MR to be switched to the mirror-up attitude Pb, is provided on one side of the four pivotal axes J1 to J4 in the drive mechanism 120. Further, the locking mechanism 140, which can not only maintain the mirror-down attitude Pa of the mirror unit MR on which the urging force of the mirror drive spring 131 acts but also release the mirror unit MR from the mirror-down attitude Pa, is provided on the one side of the drive mechanism 120. On the other hand, the toggle mechanism 15, which allows the mirror unit MR to switch its attitude between the mirror-down attitude Pa and the mirror-up attitude Pb by urging the mirror unit MR so that it takes the mirror-down attitude Pa or the mirror-up attitude Pb, is provided on the other side, which differs from the one side, of the four pivotal axes J1 to J4 in the drive mechanism 120. The above simple configuration allows the attitudes (the mirror-down attitude Pa and the mirror-up attitude Pb) of the mirror unit MR to be stably maintained in the mirror box 103.

In the mirror box 103, the toggle mechanism 15 including the toggle spring 151 and the toggle lever 152 is not necessarily employed, but a toggle mechanism 15A including only the toggle spring 151 may be employed. The toggle mechanism 15A will be described in detail.

Figure 10:
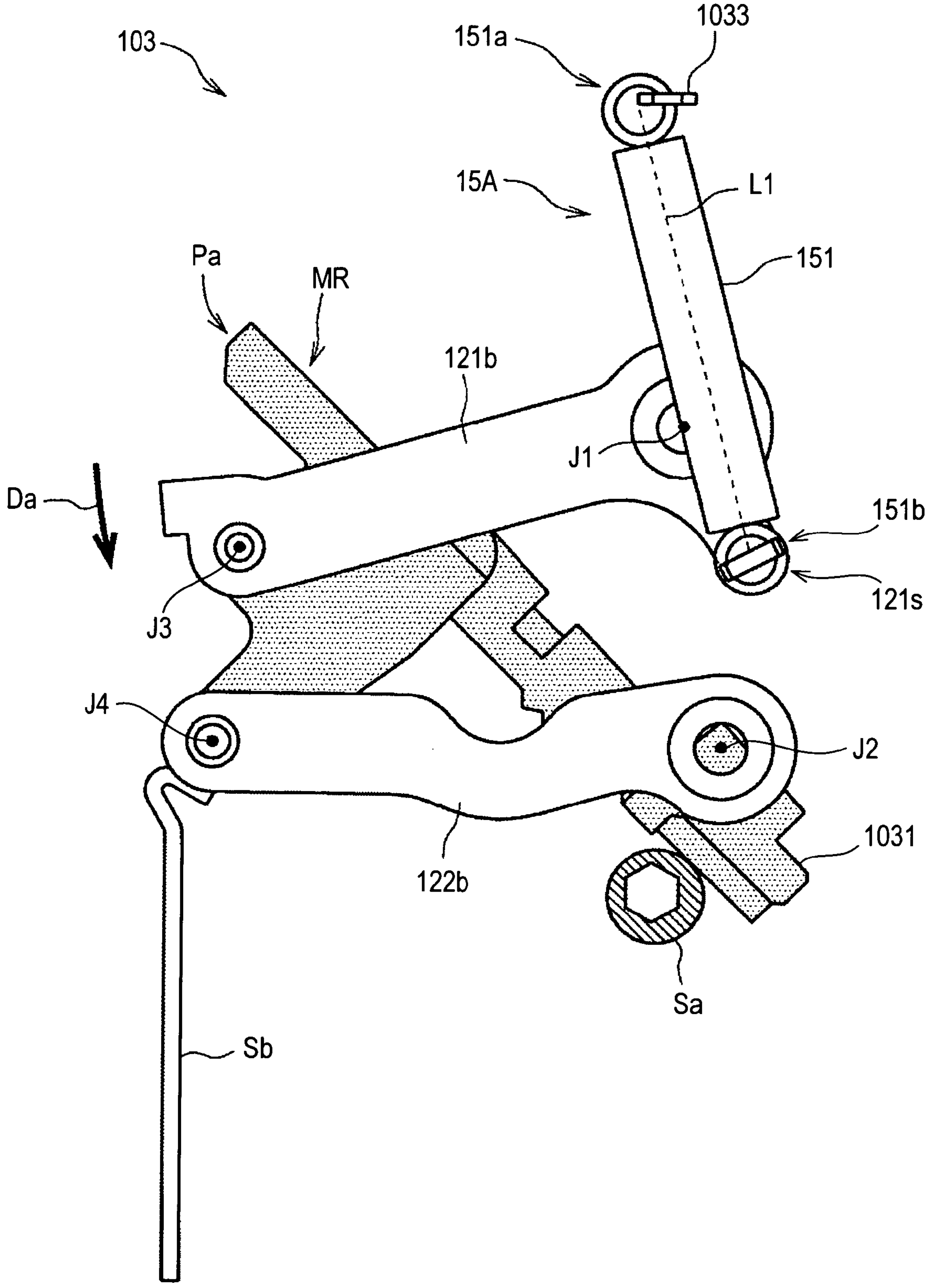
FIG. 10 explains the configuration of key portions of a toggle mechanism 15A.
Figure 11:
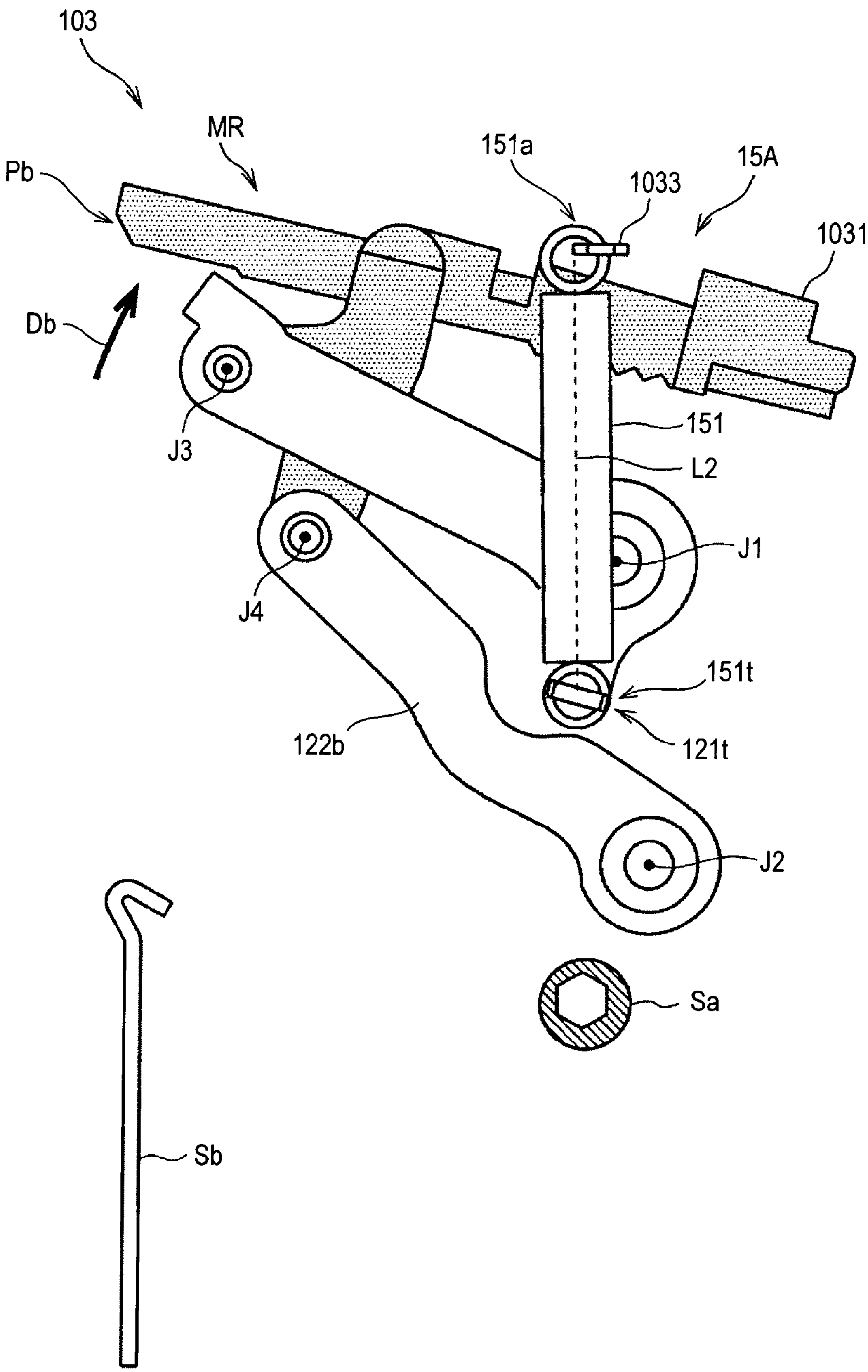
FIG. 11 explains the configuration of key portions of the toggle mechanism 15A.

FIGS. 10 and 11 explain the configuration of key portions of the toggle mechanism 15A and show the primary mirror holder 1031 and the surroundings thereof in the mirror-down attitude Pa and the mirror-up attitude Pb, respectively.

The toggle mechanism 15A includes the toggle spring 151 having the same configuration as that in the toggle mechanism 15 described above. The toggle mechanism 15A does not include the toggle lever 152 provided in the toggle mechanism 15 described above.

In the toggle mechanism 15A as well, the end 151*b* of the toggle spring 151 is connected to the end 121*s* of the drive arm 121*b* on the side where the toggle mechanism 15A is provided as in the case of the toggle mechanism 15 described above. The toggle spring 151 in the toggle mechanism 15A, when a ring provided at the other end 151*a* is hooked in a hole in a member 1033 fixed to the mirror box 103, can pivot around an axis in the vicinity of the member 1033.

The thus configured toggle mechanism 15A allows, as in the case of the toggle mechanism 15 described above, the urging force of the toggle spring 151 to act on the drive arm 121*b* in the counterclockwise direction Da around the pivotal axis J1 when the mirror unit MR takes the mirror-down attitude Pa, as shown in FIG. 10. As a result, the primary mirror holder 1031 is pressed against the stoppers Sa and Sb, whereby the mirror-down attitude Pa of the mirror unit MR can be stably maintained.

On the other hand, when the mirror unit MR takes the mirror-up attitude Pb, the toggle mechanism 15A allows the urging force of the toggle spring 151 to act on the drive arm 121*b* in the clockwise direction Db around the pivotal axis J1, as shown in FIG. 11. As a result, the mirror-up attitude Pb of the mirror unit MR can be stably maintained.

The toggle mechanism 15A described above can be simplified as compared to the toggle mechanism 15 described above, because the toggle lever 152 (FIGS. 8 and 9) can be omitted. On the other hand, since the distance from the axial line L1 of the toggle spring 151 in the mirror-down attitude Pa (FIG. 10) to the pivotal axis J1 of the drive arm 121*b* and the distance from the axial line L2 of the toggle spring 151 in the mirror-up attitude Pb (FIG. 11) to the pivotal axis J1 of the drive arm 121*b* are shorter than those in the toggle mechanism 15 described above, the force of the toggle spring 151 acting on the drive arm 121*b* is smaller. In other words, in the toggle mechanism 15 described above, providing the toggle lever 152 allows the distance from the axial line La of the toggle spring 151 in the mirror-down attitude Pa (FIG. 8) to the pivotal axis J1 of the drive arm 121*b* and the distance from the axial line Lb of the toggle spring 151 in the mirror-up attitude Pb (FIG. 9) to the pivotal axis J1 of the drive arm 121*b* to be relatively long. In the toggle mechanism 15 in which the urging force of the toggle spring 151 is transferred via the toggle lever 152 to the drive mechanism 120, the urging force of the toggle spring 151 can be efficiently transferred to the drive arm 121*b*.

<Variations>

Figure 12:
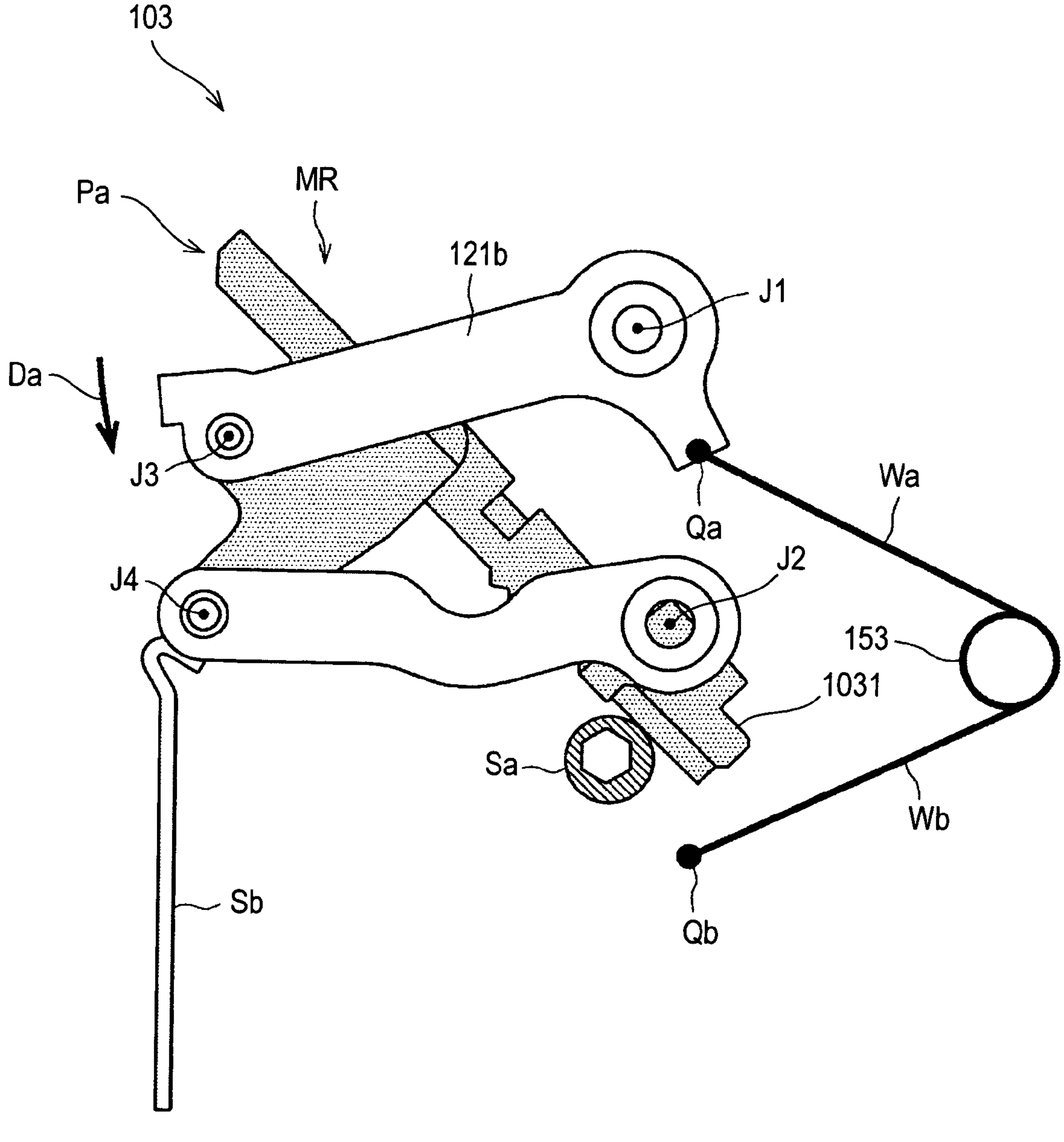
FIG. 12 explains an urging spring 153 according to a variation of the invention.
Figure 13:
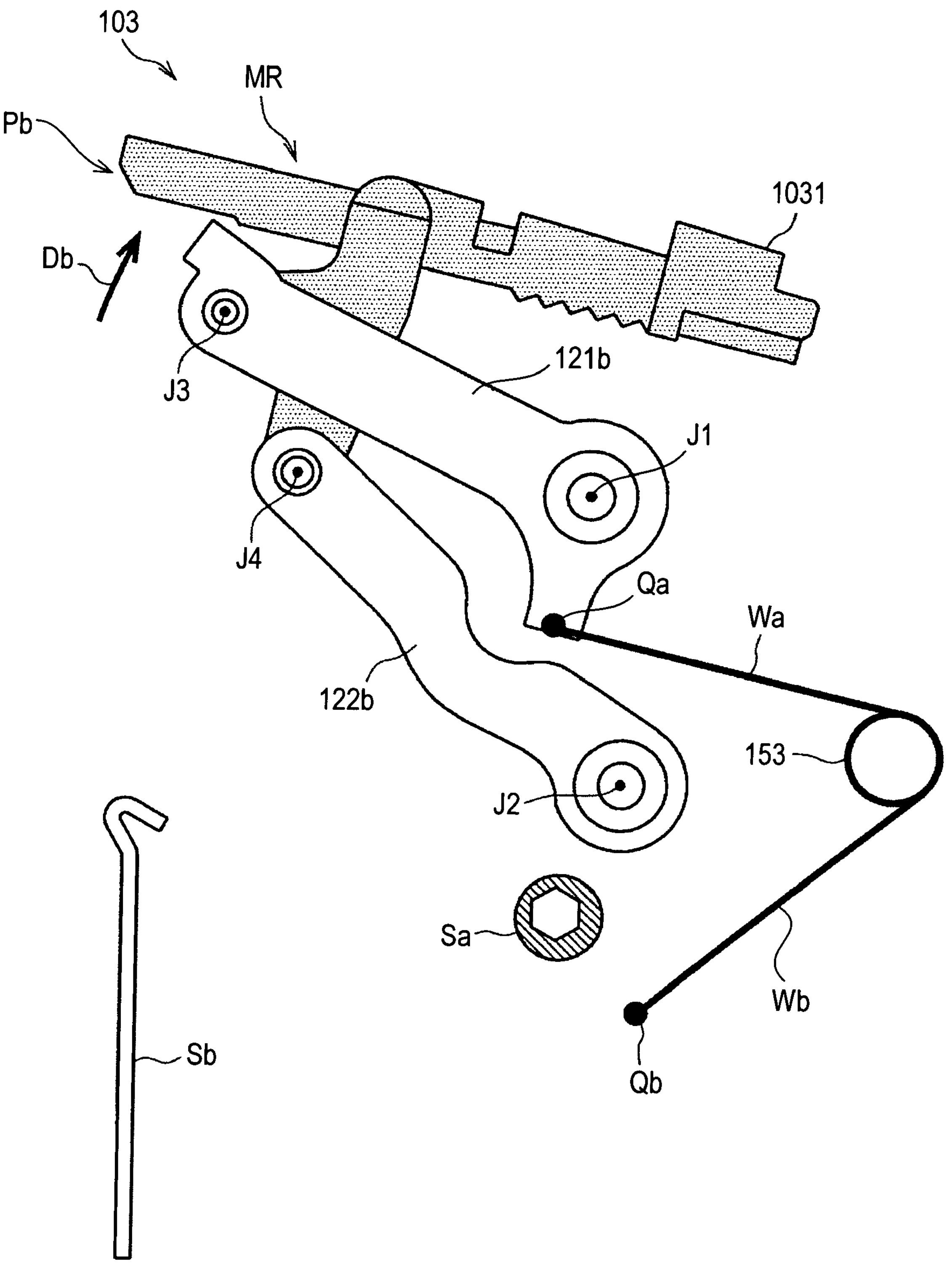
FIG. 13 explains the urging spring 153.

In the toggle mechanisms in the embodiment described above, the toggle spring is not necessarily the coiled spring 151 but may be an urging spring 153 that produces an urging force in the direction in which the distance between two arms Wa and Wb increases as shown in FIGS. 12 and 13. In this case, the tip of the arm Wa is connected to a supporting point Qa provided in the drive arm 121*b* on the side where the toggle mechanism is provided, and the tip of the arm Wb is connected to a supporting point Qb fixed to the mirror box. In this configuration, when the mirror unit MR takes the mirror-down attitude Pa, the urging force of the urging spring 153 acts on the drive arm 121*b* in the counterclockwise direction Da around the pivotal axis J1, as shown in FIG. 12. On the other hand, when the mirror unit MR takes the mirror-up attitude Pb, the urging force of the urging spring 153 acts on the drive arm 121*b* in the clockwise direction Db around the pivotal axis J1, as shown in FIG. 13. As a result, the mirror unit MR can be stably maintained in the mirror-down attitude Pa and the mirror-up attitude Pb, as in the case of the embodiment described above.

In the four-node link mechanism LM in the embodiment described above, the hole H1 in the drive arm 121 is not necessarily circular but may be linearly elongated. When such an elongated hole is formed, the primary mirror holder 1031 can abut the stoppers Sa and Sb appropriately in the mirror-down attitude Pa even when the position where the primary mirror holder 1031 comes into contact with the stopper Sa is changed in an attitude adjustment process of the mirror-down attitude Pa.

In the embodiment described above, the mirror box 103 is not necessarily provided in a digital camera, but may be provided in a silver halide camera (film camera).

The present application contains subject matter related to that disclosed in Japanese Priority Patent Application JP 2008-127015 filed in the Japan Patent Office on May 14, 2008, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A mirror drive apparatus comprising:

a movable unit including a mirror used to switch an optical path in an imaging apparatus, the movable unit having a first side and an opposite second side extending parallel to the first side, the first and second sides disposed apart from one another in a widthwise direction;

a drive mechanism capable of switching the attitude of the movable unit between a first attitude and a second attitude by pivoting the movable unit around a predetermined, fixed pivotal axis extending parallel to the widthwise direction;

an elastic member and a locking mechanism provided on the first side of the movable unit and operative to pivot about the predetermined, fixed pivotal axis, the elastic member producing an urging force for switching the attitude of the movable unit from the first attitude to the second attitude, the locking mechanism capable of maintaining the first attitude of the movable unit on which the urging force of the elastic member acts and releasing the movable unit from the first attitude; and a toggle mechanism provided on the second side of the movable unit and operative to pivot about the predetermined, fixed pivotal axis, the toggle mechanism capable of switching the attitude of the movable unit between the first attitude and the second attitude by urging the movable unit so that the movable unit takes the first attitude or the second attitude.

2. The mirror drive apparatus according to claim 1, wherein the toggle mechanism includes an urging spring that urges the movable unit so that the movable unit takes the first attitude or the second attitude, and a connection member connected to an end of the urging spring, and the urging force of the urging spring is transferred to the drive mechanism via the connection member.

3. The mirror drive apparatus according to claim 1, wherein the drive mechanism is configured as a four-node link mechanism including four pivotal axes extending parallel to the widthwise direction with one of the four pivotal axes being the predetermined, fixed pivotal axis that remains in a fixed state and two of the pivotal axes that are movable about and relative to the predetermined, fixed pivotal axis.

4. An imaging apparatus comprising:

a movable unit including a mirror used to switch an optical path, the movable unit having a first side and an opposite second side extending parallel to the first side, the first and second sides disposed apart from one another in a widthwise direction;

a drive mechanism capable of switching the attitude of the movable unit between a first attitude and a second attitude by pivoting the movable unit around a predetermined, fixed pivotal axis extending parallel to the widthwise direction;

an elastic member and a locking mechanism provided on the first side of the movable unit and operative to pivot about the predetermined pivotal axis, the elastic member producing an urging force for switching the attitude of the movable unit from the first attitude to the second attitude, the locking mechanism capable of maintaining the first attitude of the movable unit on which the urging force of the elastic member acts and releasing the movable unit from the first attitude; and a toggle mechanism provided on the second side the movable unit and operative to pivot about the predetermined, fixed pivotal axis, the toggle mechanism capable of switching the attitude of the movable unit between the first attitude and the second attitude by urging the movable unit so that the movable unit takes the first attitude or the second attitude.

* * * * *